July 23, 1968 R. J. GELINAS 3,393,563
BIASING MECHANISM FOR A FLOWMETER
Filed Oct. 12, 1965

INVENTOR.
RALPH J. GELINAS
BY R. E. Giangue
ATTORNEY 3,393,563
BIASING MECHANISM FOR A FLOWMETER
Ralph J. Gelinas, Sherman Oaks, Calif., assignor to Unicon Systems Incorporated, Van Nuys, Calif., a corporation of California
Filed Oct. 12, 1965, Ser. No. 495,059
16 Claims. (Cl. 73—228)

ABSTRACT OF THE DISCLOSURE

A magnetic biasing mechanism having relative movable magnetic members with confronting magnetic poles of like polarity which progressively approach one another during relative movement of the members in one direction to produce a magnetic bias force on the members for resisting such relative movement. A monitoring instrument, such as a flowmeter, embodying the biasing mechanism for resisting movement of a sensing element in response to the parameter being monitored.

---

This invention relates generally to biasing mechanisms for producing a variable bias force to oppose a mechanical movement. The invention has more particular reference to novel magnetic biasing mechanisms for the purpose described and to a force responsive instrument, such as a flowmeter, embodying a magnetic biasing mechanism according to the invention.

In its broader aspects, the invention provides a magnetic biasing mechanism including a pair of magnetic members having confronting magnetic poles of like polarity. These members are mounted for relative movement along a given direction line in such manner that the confronting magnetic poles approach one another during relative movement of the members in one direction along this direction line. The magnetic fields of the members thus interact to produce on the members a magnetic bias force which opposes and increases in response to relative movement of the members in said one direction and urges the members in the opposite direction of relative movement thereof. The invention is primarily concerned with the geometry of the magnetic members, whereby the magnetic bias force may be made to vary in accordance with various functions of the relative displacement of the members. In the present illustrative embodiment of the invention, for example, the geometry of the magnetic members is such as to produce a bias force which varies linearly with the relative displacement of the members. In these illustrative embodiments, the relative movement of the magnetic members is rotational, whereby the bias force varies linearly with relative angular displacement of the members.

There are many applications in the various fields of technology for magnetic biasing mechanism of the kind to which this invention pertains. One of these applications is in a force responsive instrument, such as a flowmeter, of the type wherein a force or flow responsive element is urged in one direction by the force or flow being monitored and against a bias or resisting force which increases in response to movement of the element in said one direction. The displacement of the element from its normal or zero position then is a function of the monitored force or flowrate, whereby the element may be operatively connected to a suitable readout device, such as a mechanical indicating meter. Generally, it is desirable to have a linear readout in an instrument of this kind. This requires a bias force on the force or flow responsive element of the instrument which varies in accordance with a linear function of the displacement of the element from its normal position.

My co-pending application Serial No. 458,848, filed May 26, 1965, and entitled "Flowmeter" discloses a flowmeter embodying a mechanical biasing mechanism for producing a generally linear bias force on the flow responsive element of the meter and, thereby, a generally linear meter readout. Briefly stated, this mechanical biasing mechanism comprises a number of rotary bias weights which are successively operatively connected to the flow responsive element, to resist movement thereof under the action of the monitored fluid flow, in response to displacement of the element by increase in flowrate. The resultant effective bias force on the element increases generally linearly with increasing displacement of the element from its normal position.

The present magnetic biasing mechanism exhibits certain advantages over my prior mechanical biasing mechanism. First, in my prior mechanism, the bias force is produced by the action of gravity on the bias weights. Accordingly, this mechanism is limited to operation in a gravitational field and to one particular orientation or attitude in the field. The mechanism, therefore, will not operate in a "zero g" environment. In the present magnetic biasing mechanisms, on the other hand, the required bias force is produced by magnetic means embodied directly within the mechanisms. As a result, these mechanisms may be statically and dynamically balanced to render these mechanisms totally insensitive to externally induced acceleration forces, thereby permitting the mechanisms to operate in environments wherein such forces exist, such as on moving vehicles. As will appear from the ensuing description, however, the present biasing mechanisms may be deliberately unbalanced to make the mechanisms responsive to such acceleration forces for the purpose of monitoring or measuring such forces, for example. Third, the present magnetic biasing mechanisms may be designed to exhibit greater linearity than my prior mechanisms. Also, the present mechanisms possess greater simplicity of construction and are more economical to manufacture than my prior mechanisms.

The present magnetic biasing mechanisms are disclosed herein in connection with their use in a force responsive instrument, namely, a flowmeter. It will become evident as the description proceeds, however, that the present mechanisms are not limited in usefulness to this application and may be employed in any mechanical movement requiring a bias or restraining force to resist or oppose relative motion of two parts of the movement. Moreover, the present mechanisms may be designed to exhibit either a linear or non-linear response.

Accordingly, it is a general object of the invention to provide novel magnetic biasing mechanisms of the character described.

Another object of the invention is to provide magnetic biasing mechanisms which are insensitive to both gravitational and externally induced acceleration forces, and, therefore, may be operated in any attitude in both gravitational and zero g environments, as well as in operational environments which are subject to external acceleration forces, such as on a moving vehicle.

Yet another object of the invention is to provide magnetic biasing mechanisms which may be designed to produce a bias force that varies in accordance with various functions, including an accurately linear function, of the relative displacement of the relatively movable magnetic members of the mechanisms.

A further object of the invention is to provide magnetic biasing mechanisms which are relatively simple in construction, economical to manufacture, reliable in operation, rugged, and otherwise ideally suited to their intended purposes.

Yet a further object of the invention is to provide a force responsive instrument, such as a flowmeter, embodying a magnetic biasing mechanism according to the invention.

Other objects, advantages, and features of the invention will become readily evident as the description proceeds.

With these and such other objects in view, the invention consists in the construction, arrangement of parts, and instrumentalities of the invention, whereby the objects contemplated are attained, as hereinafter set forth, pointed out in the appended claims, and illustrated in the accompanying drawings in which:

Figure 1:
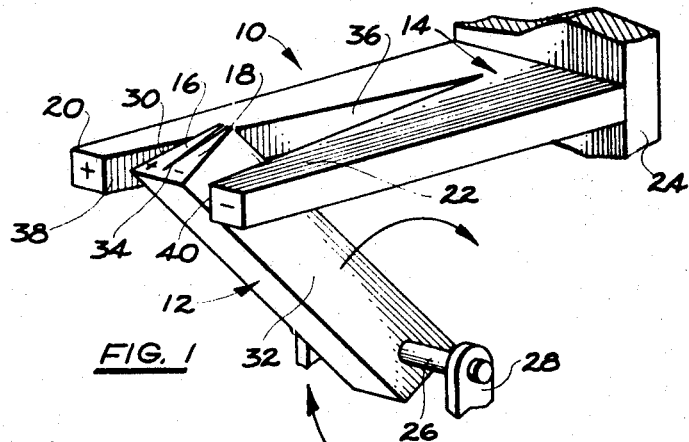
FIGURE 1 is a perspective view of a magnetic biasing mechanism according to the invention.

Referring first to FIGURE 1 of these drawings, there have been chosen for illustration therein a magnetic biasing mechanism 10 according to the invention including first and second relatively movable magnetic members 12 and 14. Member 12 has magnetic poles 16 and 18 of opposite polarity, pole 16 being a north pole and pole 18 being the south pole. Similarly, magnetic member 14 has magnetic poles 20 and 22 of opposite polarity, pole 20 being the north pole and pole 22 being the south pole. The magnetic poles of like polarity on the two members 12 and 14 are disposed in confronting relation; that is to say, the two north poles 16 and 20 are disposed in confronting relation as are the two south poles 18 and 22. Magnetic members 12 and 14 are supported by means 24 for relative movement along a given direction line in such manner that the confronting magnetic poles of like polarity on the two members, i.e., poles 16, 20 and poles 18, 22, approach another during relative movement of the members in one direction along said direction line. The magnetic fields of the members thus interact to produce on the members a magnetic bias force which resists and increases in response to relative movement of the members in said one direction and urges the members in the opposite direction of relative movement thereof. As will appear presently, in the illustrated biasing mechanism under consideration, this bias force varies in accordance with a linear function of the relative displacement of the members from a given normal or zero position thereof.

Referring now in greater detail to the magnetic biasing mechanism 10, it will be observed that the magnetic member 12 comprises a bar-like magnetic armature which is rigidly fixed at one end to and extends radially of a shaft 26. The ends of shaft 26 are rotatably supported in bearings 28 which are rigidly secured to a support 24. Armature 12 has a generally trapezoidal shape in transverse cross section and includes inclined side faces 30 and 32 which define the pole faces of the magnetic poles 16 and 18, respectively. Extending into the narrow longitudinal edge of the armature 12, in a longitudinal medial plane thereof, is a V-shaped slot 34 which separates and defines the magnetic poles 16 and 18, respectively. It is evident at this point, therefore, that the armature 12, when viewed in transverse section, comprises essentially a horseshoe magnet.

Magnetic member 14 is a magnetic stator comprising a generally rectangular magnetic plate, one end edge of which is rigidly fixed to the support 24. Extending into the opposite end edge of the stator 14 is a V-shaped slot 36, the center line of which is located substantially in the longitudinal medial plane of the stator. Slot 36 separates and defines the magnetic poles 20 and 22 of the stator 14. The edge surfaces 38 and 40 define the pole faces of the magnetic poles 20 and 22 of the stator 14. The edge surfaces 38 and 40 define the pole faces of the magnetic poles 20 and 22, respectively. At this point, therefore, it is evident that the stator 14 comprises, essentially, a horseshoe magnet.

The pivot shaft 26 for the armature 12 is disposed in spaced parallel relation to the plane of the stator 14 and extends parallel to the end edges of the stator. Shaft 26 is located approximately midway between the ends of the stator slot 36. The included angle between the armature pole faces 30, 32 is substantially equal to the included angle between the stator pole faces 38, 40. Accordingly, the confronting pole faces on the armature and stator, that is the pole faces 30, 38 and the pole faces 32, 40 generally parallel one another.

It is now evident that the armature 12 is rotatable relative to the stator 14 between the position illustrated in FIGURE 1, wherein the outer end of the armature is situated adjacent the open end of the stator slot 36, and a position adjacent the inner or closed end of this slot. This latter position of the armature is hereinafter referred to as its extended position. The position of the armature illustrated in FIGURE 1 is hereinafter referred to as its normal position. During relative rotation of the armature from its normal position to its extended position, the confronting pole faces 30, 38 and 32, 40 approach one another; that is to say, the normal spacing between the respective confronting pole faces decreases. During rotation of the armature from its extended position to its normal position, these confronting pole faces recede from one another; that is to say, the normal spacing between the respective pole faces increases. It is evident that since the confronting magnetic poles 16, 20 and 18, 22 on the armature and stator are of the same polarity, their magnetic fields interact to produce a magnetic bias force between the armature and stator which resists and increases in response to relative rotation of the armature from its normal position to its extended position and urges the armature toward its normal position. It is further evident that this bias force varies linearly with the angular displacement of the armature from its normal position. In other words, the bias force increases linearly during relative rotation of the armature from its normal position to its extended position and decreases linearly during relative rotation of the armature from its normal position to its extended position and decreases linearly during relative rotation of the armature from its extended position to its normal position.

It is significant to note that the rate of change of the magnetic bias force active between the armature 12 and stator 14 during relative rotation of the armature between its normal and extended positions may be varied by changing the included angle between the pole faces 38 and 40 on the stator. Preferably, the included angle between the pole faces 30 and 32 on the armature are changed accordingly to preserve the substantially parallel relationship between the confronting pole faces. It is evident that while the illustrated magnetic biasing mechanism 10 comprises magnetic members which are supported for relative angular or rotational movement, a magnetic biasing mechanism according to the invention may be constructed wherein the magnetic members are supported for relative translational movement.

Figure 2:
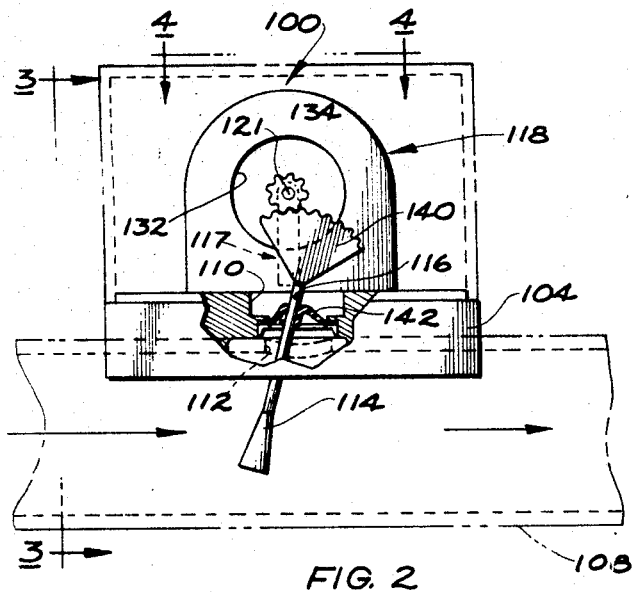
FIGURE 2 is a side elevation, partly in section, of a flowmeter embodying a modified magnetic biasing mechanism according to the invention and illustrates, in phantom outline, a fluid conduit on which the flowmeter is installed.
Figure 4:
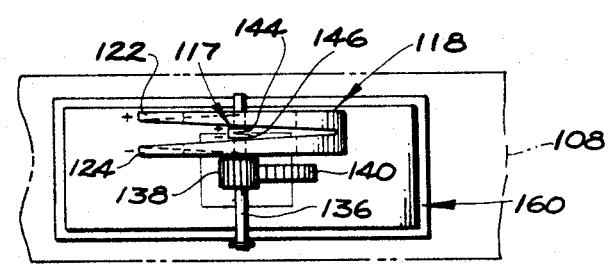
FIGURE 4 is a view looking in the direction of the arrows on line 4—4 in FIGURE 2.

Reference is now made to FIGURES 2 and 4 which illustrate a flowmeter 100 embodying a modified magnetic biasing mechanism 102 according to the invention. Flowmeter 100 comprises a support 104 having cylindrically curved undersurface 106 adapted to seat against the outer surface of a fluid conduit 108. Support 104 may be secured to the conduit 108 in any convenient way, as by welding the support to the conduit or attaching the support to the conduit by clamps or other means (not shown). If the conduit 108 contains fluid under pressure, the support 104 is suitably sealed to the conduit, for reasons which will appear as the description proceeds. Extending centrally through the support 104 is an opening 110 which is aligned with an opening 112 in the conduit. Within these openings is a movable force or flow responsive element 114. In the illustrated flowmeter, responsive element 114 comprises a vane, one end of which is pivotally mounted at 116 on the support 104. The opposite end of the vane 114 is disposed within the fluid passage through the conduit. The pivot axis 116 of the vane is arranged so that the axis extends normal to the axis of the conduit when the flowmeter 100 is installed on the conduit. Accordingly, the vane 114 is movable or swingable endwise of the conduit. Fluid flowing through the conduit thus creates a force or torque on the vane which urges the latter in one direction about its pivot axis 116. In FIGURE 2, for example, fluid flowing through the conduit 108 in the direction indicated by the arrows creates a right-hand force on the vane 114 which urges the latter in a counterclockwise direction on its pivot axis.

The magnetic biasing mechanism 102 embodied in the flowmeter 100 imposes a magnetic bias force on the vane 114 which resists and increases in response to pivotal movement of the vane 114 in the direction in which it is urged by the fluid flowing through the conduit 108, i.e., the counterclockwise direction in FIGURE 2, and urges the vane in the opposite direction. The magnetic biasing mechanism 102 comprises a first magnetic member 117 which functions as a magnetic armature and a second magnetic member 118 which functions as a magnetic stator. Stator 118 comprises a magnetic plate having a normally lower planar edge which is rigidly secured to the flowmeter support 104 and a normally upper circularly curved edge. The stator is disposed in a plane generally normal to the pivot axis 116 of the vane 114 and is offset, lengthwise of this axis, from the plane of swinging movement of the vane. Extending edgewise through the armature plate 118, midway between the side faces thereof, is a slot 120 which is generally tapered in a circumferential direction about the axis 121 of curvature of the upper circularly curved edge of the plate. This slot opens through the lower, left-hand, and upper edges of the armature plate, as the latter is viewed in FIGURE 2. The portions of the armature plate at opposite sides of the slot 120 define magnetic poles 122 and 124 of opposite polarity. Pole 122 is the north pole and pole 124 is the south pole. The inner, confronting faces 126 and 128 of the armature plate portions at opposite sides of the slot 120 define the pole faces of the magnetic poles 122 and 124, respectively. These pole faces extend circumferentially about the axis 121 of curvature of the upper circularly curved edges of the magnetic poles 122, 124. The pole faces terminate at one end below and slightly to the right of a vertical plane containing the axis 121 and at the opposite end to the right of the axis 121, approximately in a horizontal plane containing the latter axis. For convenience, the ends of the pole faces located below the axis 121 are hereinafter referred to as their leading ends. The opposite ends of these faces are referred to as their trailing ends. As shown in the drawings, the pole faces 126, 128 are generally helically inclined in such a way that these faces approach one another toward their trailing ends.

Extending through the magnetic poles 122, 124 of the stator 118, on the axis 121, are bores 132 in which are press-fitted bearing discs 134 of non-magnetically permeable material. A pivot shaft 136 extends coaxially through and is journaled in these bearing discs. Shaft 136 is restrained against axial movement by thrust bearings (not shown). Fixed to the shaft 136 is a pinion 138 which is disposed in the plane of swinging movement of the vane 114. A sector gear 140, fixed to the vane 114 coaxial with its pivot axis 116, meshes with the pinion 138. It is evident at this point, therefore, that pivotal movement of vane 114 rotates the pivot shaft 136. It is significant to note here that counterclockwise pivotal movement of the vane, as the flowmeter is viewed in FIGURE 2, in response to fluid flow through the conduit 108, rotates the pivot shaft 136 in a clockwise direction relative to the stator 118. In the event that the conduit 108 contains fluid under pressure, it is necessary to seal the opening 110 in the flowmeter support 104, to prevent fluid leakage therethrough, without interfering with this pivotal movement of the vane. To this end, the illustrated flowmeter is equipped with a flexible diaphragm 142 within the support opening 110. This diaphragm is sealed to the wall of the opening 110 and to the shaft of the vane 114, adjacent its pivot axis 116.

Armature 117 comprises a magnetic bar which is longitudinally slotted in the same way as the armature 142 in the earlier magnetic biasing mechanism 10 of the invention to define on the armature magnetic poles 144 and 146 of opposite polarity. Pole 144 is the north pole and pole 146 is the south pole. Armature 117 is disposed within the slot or gap 120 in the stator 118, approximately midway between the confronting stator pole faces 126, 128. One end of the armature is fixed to the pivot shaft 136 in such a way that the armature extends radially from the shaft to a position wherein the outer end of the armature is disposed between the stator pole faces 126, 128. The side faces 148, 150 of the armature define the pole faces of the magnetic poles 144, 146, respectively. The armature pole faces 144, 146 are disposed in confronting relation to the stator pole faces 126, 128, respectively. In the drawings, the armature pole faces are shown to be disposed in parallel planes normal to the pivot axis 136. If desired, however, the latter pole faces may be inclined in such a way as to generally parallel their respective stator pole faces. It is significant to note here that the magnetic poles of like polarity on the armature 117 and stator 118 are disposed in confronting relation; that is to say, the north pole 144 on the armature confronts the north pole 122 on the stator. Similarly, the south pole 146 on the armature confronts the south pole 124 on the stator.

In describing the operation of the flowmeter 100, as it is thus far described, it will be assumed that the flowmeter is installed on the fluid conduit 108 and that fluid is flowing through this conduit in the direction of the arrows in FIGURE 2. This fluid exerts a counterclockwise force or torque on the vane 114 which urges the latter in a counterclockwise direction about its pivot axis 116. Such torque is transmitted through the sector gear 140 and the pinion 138 to the pivot shaft 136 and urges the armature 117 in a clockwise direction about its pivot axis 121 from the position illustrated in the drawings, wherein the outer end of the armature is located adjacent the leading end of the stator pole faces 126, 128, toward a position wherein the outer end of the armature is located adjacent the trailing ends of these pole faces. For convenience, the illustrated position of the armature is hereinafter referred to as its normal position. The position of the armature wherein its outer end is located adjacent the trailing ends of the stator pole faces is hereinafter referred to as its extended position.

During rotation of the armature 117 from its normal position to its extended position, the magnetic poles of opposite polarity on the armature and stator 118, i.e., poles 144, 122 and poles 146, 124, approach one another; that is to say, the normal spacing between the confronting faces of these confronting poles, i.e., pole faces 148, 126 and pole faces 150, 128, decrease. During rotation of the armature from its extended position to its normal position, the confronting magnetic poles of like polarity on the armature and stator recede from one another; that is to say, the normal spacing between the confronting faces of the respective confronting magnetic poles increases. It is evident, therefore, that the magnetic fields of the armature 117 and stator 118 interact to produce a bias force on the armature which resists and increases in response to relative rotation of the armature from its normal position to its extended position. This bias force, therefore, resists and increases in response to pivotal movement of the flow responsive vane 114 in the direction of fluid flow through the conduit 108. This bias force obviously varies linearly with the angular displacement of the armature 117 from its normal position. Accordingly, the bias force imposed on the vane 114 varies linearly with the angular displacement of the vane from its normal position of FIGURE 2.

It is now evident, therefore, that pivotal movement of the vane 114 in response to fluid flow through the conduit 108 is resisted by a magnetic bias force which increases linearly as the vane swings in the direction of such fluid flow. The force exerted by the fluid on the vane is proportional to the flowrate of the fluid. Accordingly, during operation of the flowmeter 100, the vane 114 is rotated in the direction of fluid flow through the conduit 108 until the linearly increasing bias force imposed on the vane by the magnetic biasing mechanism 102 equals the force imposed on the vane by the flowing fluid. The vane then remains stationary in a condition of static equilibrium until the flowrate of the fluid changes. This causes rotation of the vane in one direction or the other, depending upon whether the flowrate increases or decreases, to a new position of static equilibrium. Accordingly, the angular position of the vane 114, and hence the angular position of the pivot shaft 136, are continuously linearly related to the flowrate of fluid through the conduit 108.

Flowmeter 100 is equipped with a readout means 152 for providing an output function related to the flowrate. This readout means may comprise an indicating meter having a needle 154 which is fixed to the shaft 136 and rotates along a suitably calibrated scale 156 inscribed or otherwise provided on the wall of a housing 160 which encloses the magnetic biasing mechanism 102. Housing 160 may be secured to the flowmeter support 104 in any convenient way.

Figure 3:
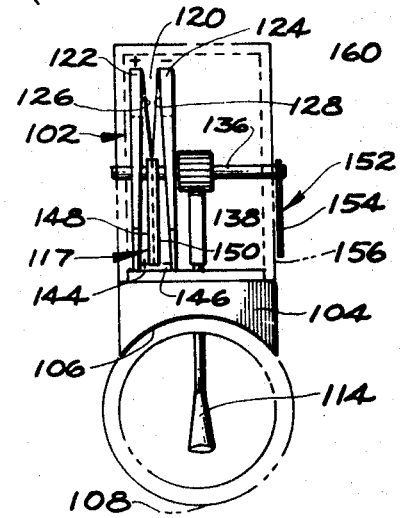
FIGURE 3 is a view looking in the direction of the arrows on line 3—3 in FIGURE 2.

While the invention has been disclosed herein in connection with magnetic biasing mechanisms which produce a linear bias force, that is a force which varies linearly with displacement of the magnetic members, it is evident that the invention may be embodied in magnetic biasing mechanisms which exhibit a non-linear bias force. Such a non-linear bias force may be obtained in the magnetic biasing mechanism 10 of FIGURE 1, for example, by providing the stator pole faces 38 and 40 with a non-planar configuration. Similarly, the magnetic biasing mechanism 102 of FIGURES 2 through 4 may be revised to produce a non-linear bias force by altering the configuration of the stator pole faces 126, 128. Moreover, while the invention has been disclosed in connection with its application to the measurement of flowrate, magnetic biasing mechanisms according to the invention may be utilized for other purposes, such as monitoring or measuring other parameters.

Accordingly, the invention herein described and illustrated is fully capable of attaining the several objects and advantages preliminarily set forth.

While certain illustrative embodiments of the invention have been disclosed in order to illustrate the invention, various modifications in the design, arrangement of parts, and instrumentalities of the invention are possible within the spirit and scope of the following claims.

What is claimed as new in support of Letters Patent is:
1. A magnetic biasing mechanism comprising:
first and second magnetic members each having magnetic poles of opposite polarity;
means supporting said members for relative movement in such manner that the relative movement of said first member with respect to said second member occurs in a given plane and along a direction line in said plane; and
at least one magnetic pole of said first member and the magnetic pole of like polarity of said second member being disposed in confronting relation, the face of the latter pole being located in a plane which is inclined at an acute angle relative to said given plane and approaches said given plane in one direction along said direction line, and the extent of said latter pole face in the direction of relative movement of said members being substantially greater than the corresponding extent of the confronting pole face on said first member and approximating the normal range of relative movement of said members, whereby said confronting poles approach one another during relative movement of said members in one direction along said direction line, thereby to produce on said members a magnetic bias force which opposes and increases in response to relative movement of said members in said one direction and urges said members in the opposite direction.

2. A magnetic biasing mechanism comprising:
first and second magnetic members each having magnetic poles of opposite polarity;
means supporting said members for relative movement in such manner that the relative movement of said first member with respect to said second member occurs in a given plane and along a direction line in said plane; and
each magnetic pole of said first member and the magnetic pole of like polarity of said second member being disposed in confronting relation, the pole faces of said second member being located in planes, respectively, which are inclined at acute angles relative to said given plane and approach said given plane in one direction along said direction line, and the extent of said latter pole faces in the direction of relative movement of said members being substantially greater than the corresponding extent of the confronting pole faces of said first member and approximating the normal range of relative movement of said members, whereby the respective confronting poles of like polarity approach one another during relative movement of said members in one direction along said direction line, thereby to produce on said members a magnetic bias force which opposes and increases in response to relative movement of said members in said one direction and urges said members in the opposite direction.

3. A magnetic biasing mechanism comprising:
first and second magnetic members each having magnetic poles of opposite polarity; means supporting said members for relative rotation in such manner that relative rotation of said first member with repect to said second member occurs in a given plane; and
at least one magnetic pole of said first member and the magnetic pole of like polarity of said second member being disposed in confronting relation, the face of the latter pole being located in a plane which is inclined at an acute angle relative to said given plane and approaches said given plane in one direction of relative rotation of said first member, and the extent of said latter pole face in the direction of relative rotation of said members being substantially greater than the corresponding extent of the confronting pole face on said first member and approximating the normal range of relative rotation of said members, whereby said confronting poles approach one another during relative rotation of said members in one direction, thereby to produce on said members a magnetic bias force which opposes and increases in response to relative rotation of said members in said one direction and urges said members in the opposite direction.

4. A magnetic biasing mechanism comprising:
first and second magnetic members each having magnetic poles of opposite polarity;
means supporting said members for relative rotation in such manner that relative rotation of said first member with respect to said second member occurs in a given plane; and each magnetic pole of said first member and the magnetic pole of like polarity of said second member being disposed in confronting relation, the pole faces of said second member being located in planes, respectively, which are inclined at acute angles relative to said given plane and approach said given plane in one direction of relative rotation of said first member, and the extent of said latter pole faces in the direction of relative rotation of said members being substantially greater than the corresponding extent of the confronting pole faces on said first member and approximating the normal range of relative rotation of said members, whereby the respective confronting poles of like polarity approach one another during relative rotation of said members in one direction, thereby to produce on said members a magnetic bias force which opposes and increases in response to relative rotation of said members in said one direction and urges said members in the opposite direction.

5. A magnetic biasing mechanism according to claim 2 wherein:
the pole faces of said first member are located at opposite sides of the latter member; and
the pole faces on said second member straddle said first member and converge in said one direction.

6. A magnetic biasing mechanism according to claim 4 wherein:
the pole faces of said first member are located at opposite sides of the latter member; and
the poles faces on said second member straddle and first member and converge in one direction about the axis of relative rotation of said members.

7. A magnetic biasing mechanism comprising:
a magnetic plate having magnetic poles of opposite polarity separated by an intervening, generally V-shaped slot bounded by longitudinal edge surfaces on said plate defining the pole faces of said magnetic poles, respectively;
a magnetic member disposed within said slot having magnetic poles of opposite polarity with pole faces confronting said pole faces, respectively, on said plate;
means mounting said plate and member for relative movement thereof lengthwise of said slot; and
each magnetic pole of said plate being disposed opposite the magnetic pole of like polarity on said member, whereby the magnetic poles of like polarity on said plate and member approach one another during relative movement of said plate and member in one direction, thereby to produce on said plate and member a magnetic bias force which opposes and increases in response to relative movement of said plate and member in said direction.

8. A magnetic biasing mechanism according to claim 7 wherein:
said plate and member are mounted for relative rotation.

9. A magnetic biasing mechanism comprising:
a first magnetic member having generally disc shaped magnetic poles of opposite polarity with spaced, confronting, generally circular and coaxial pole faces which converge at an acute angle in one direction about the common axis of said faces;
a second magnetic member disposed between said pole faces and extending generally radially of said axis;
means mounting said members for relative rotation on said axis;
said second member having magnetic poles of opposite polarity with pole faces confronting said circular pole faces, respectively, on said first member; and
each magnetic pole of said first member being disposed opposite the magnetic pole of like polarity of said second member whereby the magnetic poles of like polarity on said members approach one another during relative rotation of said members in one direction on said axis, thereby to produce on said members a magnetic bias force which opposes and increases in response to relative rotation of said members in said one direction.

10. A monitoring instrument comprising:
a support;
a sensing element mounted on said support for movement in a given plane of said support in response to the parameter to be measured;
magnetic means for imposing on said element a magnetic bias force which opposes and increases in response to relative movement of said elements in one direction including magnetic members operatively connected to said support and element, respectively, and having confronting magnetic poles of like polarity, the face of the magnetic pole on said support being disposed in a plane which is inclined at an acute angle relative to and approaches said given plane in said one direction, and the extent of said latter pole face in the direction of movement of said element being substantially greater than the corresponding extent of the confronting pole face on said element and approximating the normal range of movement of said element, whereby said poles approach one another during relative movement of said element in said one direction; and
a readout means operatively connected to said element.

11. A measuring instrument according to claim 10 wherein:
said confronting magnetic poles approach one another in accordance with a linear function of the relative displacement of said element, whereby said bias force increases in accordance with a linear function of the relative displacement of said element in said given direction.

12. A measuring instrument according to claim 10 wherein:
said responsive element is pivotally mounted on said support; and
one of said magnetic members is fixed to said support and the other magnetic member is rotatably mounted on said support for rotation relative to said fixed member in response to pivotal movement of said element.

13. A flowmeter for measuring the rate of flow through a conduit comprising:
a support;
a flow responsive element mounted on said support for movement along a given direction line relative to said support;
means for mounting said support on said conduit with said element disposed within and movable lengthwise of said conduit, whereby said element is adapted to be urged in one direction along said direction line relative to said support by flow through said conduit;
magnetic means for imposing on said element a magnetic bias force which opposes and increases in response to relative movement of said element in said one direction along said direction line including magnetic members operatively connected to said support and element, respectively, and having confronting magnetic poles of like polarity which approach one another during relative movement of said element in said one direction; and
flowrate readout means operatively connected to said element.

14. A flowmeter according to claim 13 wherein:
said confronting magnetic poles approach and recede from one another in accordance with a linear function of the relative displacement of said element along said direction line, whereby said magnetic bias force varies in accordance with a linear function of the relative displacement of said element along said direction line.

15. A flowmeter according to claim 13 wherein:
said flow responsive element comprises a vane pivoted on said support;
one of said magnetic members is fixed to said support; and
the other magnetic member is rotatably mounted on said support and operatively connected to said vane for rotation relative to said fixed member in response to pivotal movement of said vane.

16. A flowmeter for measuring flow through a conduit comprising:
a support;
a flow responsive vane pivotally mounted on said support;
means for mounting said support on said conduit with said vane disposed within and movable lengthwise of said conduit, whereby said vane is adapted to be urged in one direction about its pivot axis relative to said support by flow through said conduit;
a shaft rotatably mounted on said support;
means operatively connecting said shaft and vane for rotation of said shaft in response to pivotal movement of said vane;
a first magnetic member fixed to and extending generally radially of said shaft;
a second magnetic member fixed to said support in surrounding relation to said shaft;
said second magnetic member having magnetic poles of opposite polarity which straddle said first magnetic member;
said first magnetic member having magnetic poles of opposite polarity confronting the magnetic poles, respectively, on said second magnetic member;
the confronting magnetic poles on said members being of like polarity and having confronting pole faces, respectively; and
the pole faces on said second magnetic member being generally circularly curved about said shaft and approaching one another in the direction in which said first magnetic member is rotated in response to pivotal movement of said vane in said one direction of pivotal movement thereof, whereby said confronting magnetic poles of like polarity on said members approach one another during rotation of said first magnetic member in said direction of rotation thereof to produce on said vane a magnetic bias force which opposes and increases in response to pivotal movement of said vane in said one direction thereof.

References Cited

UNITED STATES PATENTS

| | | | |
|---|---|---|---|
| 1,980,956 | 11/1934 | Okey. | |
| 2,350,741 | 6/1944 | Ford | 73—388 X |
| 2,755,668 | 7/1956 | Meyer | 73—205 X |
| 2,979,948 | 4/1961 | Gwathmey | 73—228 |
| 3,319,729 | 5/1967 | Iwasaki | 177—185 X |

FOREIGN PATENTS 712,149    9/1941    Germany.

RICHARD C. QUEISSER, *Primary Examiner.*

E. D. GILHOOLY, *Assistant Examiner.*